March 24, 1936.  D. HAVAS  2,035,066
BATTERY BOX
Original Filed Jan. 27, 1933  2 Sheets-Sheet 1
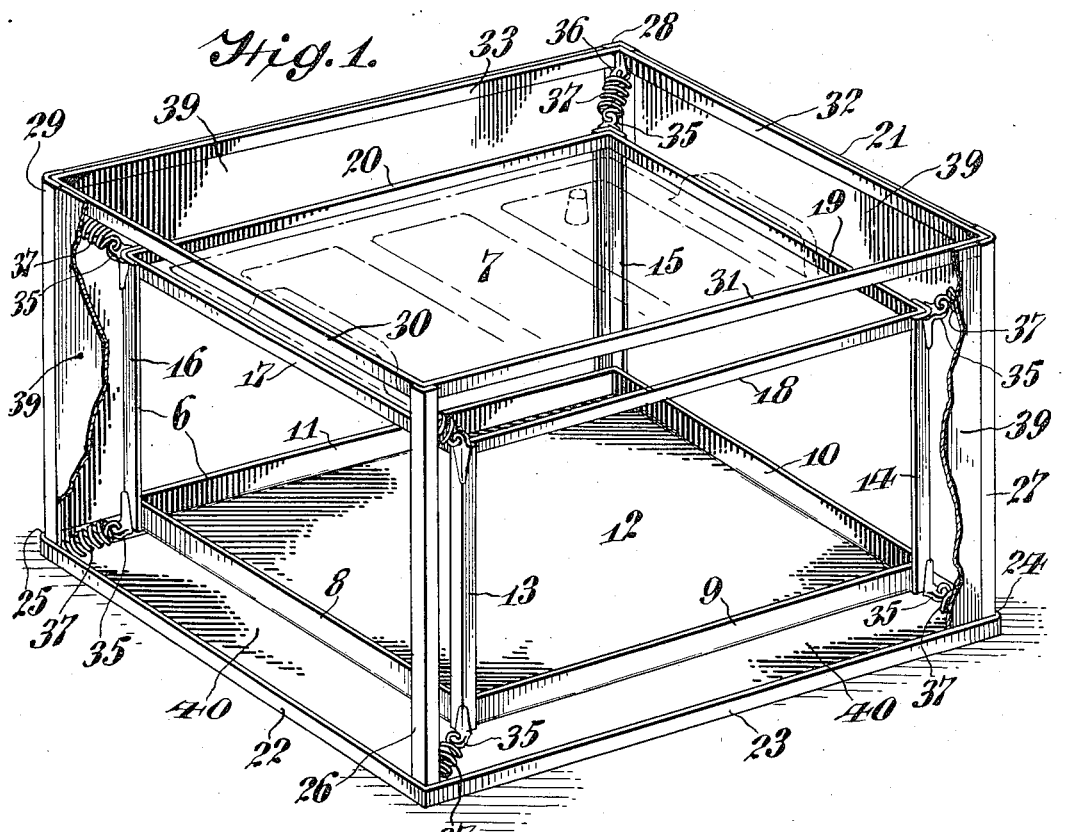
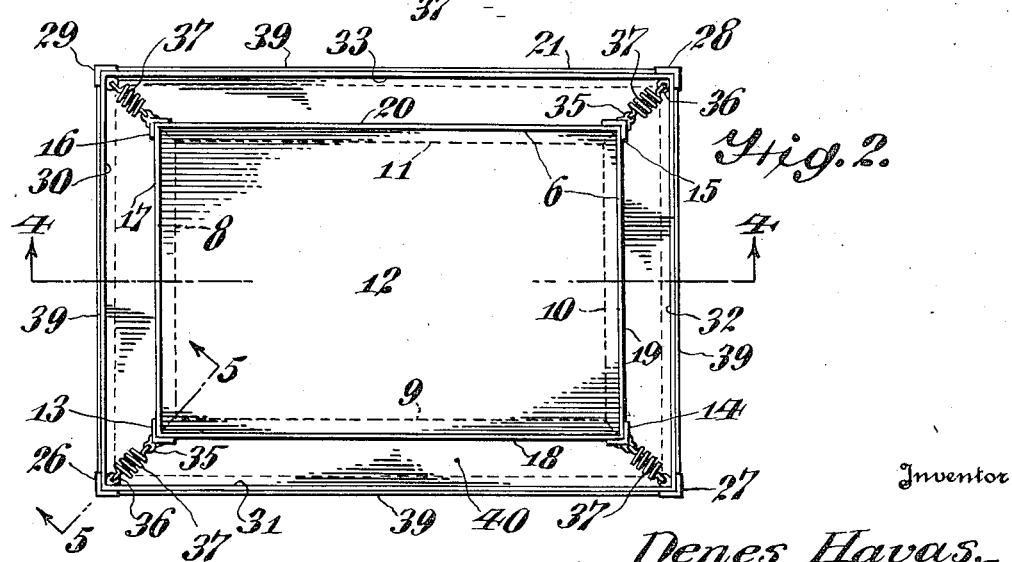
Inventor
Denes Havas,
By Leonard F. Kalish
Attorney March 24, 1936.  D. HAVAS  2,035,066
BATTERY BOX
Original Filed Jan. 27, 1933  2 Sheets-Sheet 2
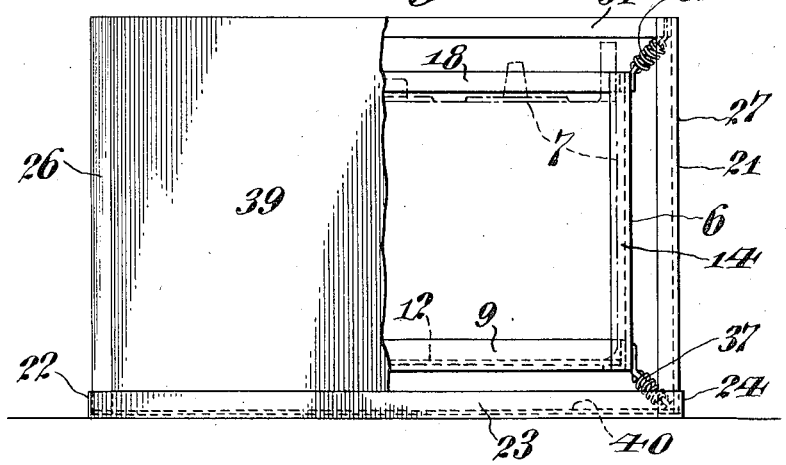
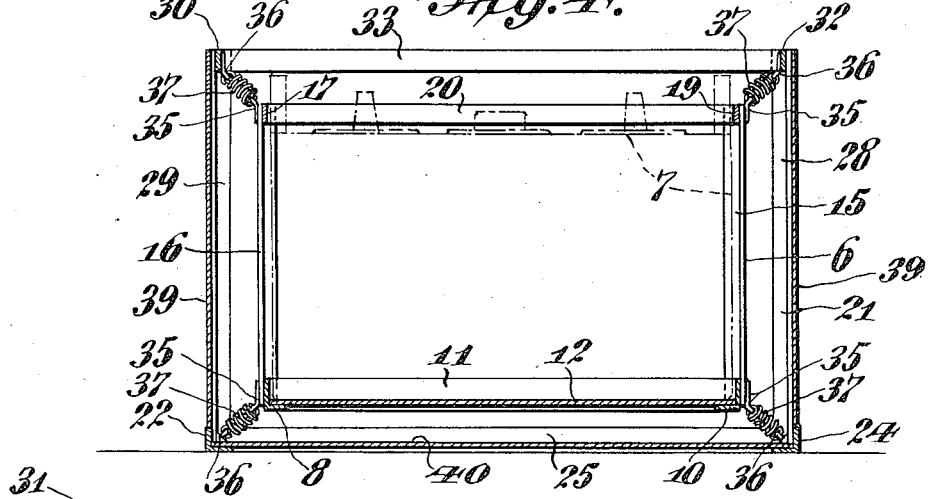
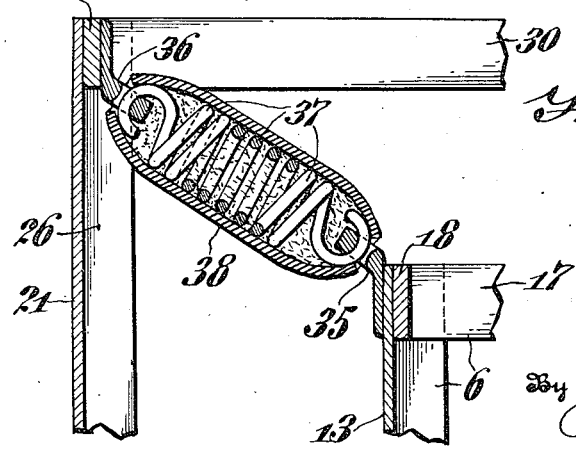
Inventor
Denes Havas,
By Leonard L. Kalish
Attorney Patented Mar. 24, 1936

2,035,066

UNITED STATES PATENT OFFICE 2,035,066

BATTERY BOX

Denes Havas, Flourtown, Pa., assignor to Motor Parts Company, Philadelphia, Pa., a corporation of Pennsylvania Application January 27, 1933, Serial No. 653,823
Renewed August 13, 1935

6 Claims. (Cl. 180—68.5)

The present invention relates to a new and useful battery box, particularly for automobiles, including passenger vehicles and trucks and busses, whereby the life of the battery may be extended by protecting the same against the shocks incident to the jarring of the vehicle.

It is an object of the present invention to provide a battery box, in which the storage battery may be placed, and which will most effectively safeguard the storage battery against the various stresses and strains incident to the movements of the vehicle, particularly over rough roads.

It is well known that one of the causes of deterioration of storage batteries is the loosening and dislocation and breakage of the relatively heavy lead plates which form the vital elements of the storage battery. These lead plates, that is, the electrodes of the storage battery, are formed of lead, and yet are relatively thin and fragile, and are supported in place by means which, while sufficient for ordinary usage, are not able to withstand severe vibrations and jarring.

The principal object of the present invention is to provide a cradle-like support for storage batteries, particularly for trucks, busses and also for passenger vehicles, or private pleasure cars, which will shield the storage battery from the sudden or sharp jars or impacts incident to rough roads, particularly at high speeds.

With the above and other objects in view, the present invention consists of a battery box formed of an inner and an outer frame, generally parallel to each other, and resiliently spaced from each other in all directions by a series of springs operatively interposed between the two frame members, and so arranged as to cause the inner frame to float freely upon the springs without any fixed or rigid connection in any direction.

The present invention further consists of other novel features of construction which will appear more fully from the following detail description.

For the purpose of illustrating the invention, there is shown in the accompanying drawings, one form thereof which is at present preferred, since the same has been found in practice to give satisfactory and reliable results, although it is to be understood that the various instrumentalities of which the invention consists can be variously arranged and organized and that the invention is not limited to the precise arrangement and organization of the instrumentalities as herein shown and descrbed.

Referring to the drawings in which like reference characters indicate like parts, Figure 1 represents a perspective view of a battery box embodying the present invention, with the sides of the outer frame partly broken away, so as to expose to view the interior thereof.

Figure 2 represents a top plan view of the battery box embodying the present invention. Figure 3 represents a side elevational view of the battery box embodying the present invention, partly broken away.

Figure 4 represents a section on line 4—4 of Figure 2. Figure 5 represents a section on line 5—5 of Figure 2, on a much enlarged scale.

The battery box of the present invention includes an inner frame or box 6, into which the battery 7 is adapted to be placed. The box 6 is formed of metal and is sufficiently rigid and strong to prevent any distortion thereof by reason of the character of the support therefor.

In the embodiment of the invention herein shown, the box 6 is formed of angle iron members 8, 9, 10 and 11, which define the bottom of the box, and the lengths of which are determined by the size of the storage battery 7 which this box is intended to receive.

The bottom may be completed by a bottom plate 12, of suitable gauge sheet metal which is supported upon the horizontal flanges of the angle iron members 8, 9, 10 and 11.

The vertical corners of the inner box 6 are also preferably formed of angle iron members 13, 14, 15 and 16, to the upper terminals of which the upper frame members 17, 18, 19 and 20 are secured. The union of the frame members may be effected by riveting, welding or the like. In the preferred embodiment of this invention, however, these members are welded to each other.

The outer box or frame 21 is similarly formed of the lower frame members 22, 23, 24 and 25, which are preferably of angle iron, and the upright corner members 26, 27, 28 and 29, also of angle iron, and the upper frame members 30, 31, 32 and 33; all united to each other by riveting or welding.

To the exterior of each of the corners of the inner box 6 spring anchorages 35 are secured, preferably by welding, and a similar spring anchorage 36 is secured to the interior of each of the corners of the outer box 21. A helical tension spring 37 is operatively interposed between each pair of juxtaposed anchorage members 35 and 36. The springs 37 are of such length that when the battery box is assembled they will be under a suitable degree of tension. The size and proportions of the springs are further so selected that each spring will be capable of supporting a weight equal to approximately one fourth of the weight of the storage battery and the weight of the inner box, when the spring is stretched approximately one inch from its normal contracted position.

Each of the springs 37 is surrounded by a flexible rubber or other suitable covering of generally tubular form, which is preferably drawn in at both ends, so as to encase the springs to the greatest extent possible. Grease or other suitable substance may be inserted in the tubular housings 38, so as to guard the springs against corrosion.

If desired, the outer box may be provided with side panels 39, and a bottom panel 40.

It will be observed that the spring anchorage members are so formed as to provide a substantial bearing surface for the ends of the springs. This is in order to prevent undue wearing of the spring ends.

If desired also, an auxiliary tie may be extended between each pair of juxtaposed anchorage members, in the nature of a loose chain or in the nature of a metal link which interconnects the juxtaposed anchorage members loosely. This metallic link may extend through the spring member and will serve to support the inner box, in the event of the accidental breakage of a spring. Naturally, the auxiliary connectors are required only at the four upper corners and not at the four lower corners. To this end an auxiliary eyelet may be provided on each of the spring anchorage members for the reception of this auxiliary connector or link or chain.

By the present invention, not only may the life of the battery be increased, but its efficiency also maintained because of the elimination of break-down in the battery plates.

The invention may be embodied in other specific forms without departing from the spirit or essential attributes thereof, and it is desired therefore that the present embodiment be considered in all respects as illustrative and not restrictive, reference being had to the appended claims rather than to the foregoing description to indicate the scope of the invention.

The invention having been thus described, what is hereby claimed as new, and for which protection is sought, is as follows:

1. A battery box for supporting a battery within an automobile comprising an outer receptacle adapted to be mounted on a part of the automobile, an inner receptacle adapted to contain the battery, said inner receptacle comprising upright angle elements and horizontal members connecting the ends of the upright elements to form a skeleton structure having substantially open sides, an open top for insertion and removal of the battery and a support for the bottom of the battery, a spring anchorage member at each exterior corner of the inner receptacle and at each interior corner of the outer receptacle, and a spring connecting each juxtaposed pair of anchorage members supporting the inner receptacle within the outer receptacle, the springs at the top corners exerting forces opposing the forces exerted by the springs at the bottom corners.

2. A battery box for supporting a battery within an automobile comprising an outer receptacle adapted to be mounted on a part of the automobile, an inner receptacle adapted to contain the battery, said inner receptacle comprising upright angle elements and horizontal members connecting the ends thereof to form a skeleton structure having substantially open sides, an open top for insertion and removal of the battery, and a support for the bottom of the battery, a spring anchorage member secured to each end of each angle element at the vertex thereof, other spring anchorage members secured to the outer receptacle at its interior corners, and a spring connecting each juxtaposed pair of anchorage members supporting the inner receptacle within the outer receptacle, the springs at the top corners exerting forces opposing the forces exerted by the springs at the bottom corners.

3. A battery box for supporting a battery within an automobile comprising an outer receptacle adapted to be mounted on a part of the automobile, an inner receptacle adapted to contain the battery, said inner receptacle comprising upright angle elements and horizontal members connecting the ends of the upright elements to form a skeleton structure having substantially open sides, an open top for insertion and removal of the battery and a support for the bottom of the battery, a spring anchorage member at each exterior corner of the inner receptacle and at each interior corner of the outer receptacle, and a spring connecting each juxtaposed pair of anchorage members supporting the inner receptacle within the outer receptacle, the springs at the top corners exerting forces opposing the forces exerted by the springs at the bottom corners, and flexible casings surrounding the springs adapted to contain a corrosion-preventing material.

4. A battery box for supporting a battery within an automobile comprising an outer metallic receptacle adapted to be mounted on a part of the automobile, an inner receptacle adapted to contain the battery, said inner receptacle comprising upright metallic angle elements and horizontal metallic members connecting the ends of the upright elements to form a structure having a substantially open top for insertion and removal of the battery and a support for the bottom of the battery, a spring anchorage member at each exterior corner of the inner receptacle and at each interior corner of the outer receptacle, and a spring connecting each juxtaposed pair of anchorage members supporting the inner receptacle within the outer receptacle, the springs at the top corners exerting forces opposing the forces exerted by the springs at the bottom corners.

5. A battery box for supporting a battery within an automobile comprising an outer metallic receptacle adapted to be mounted on a part of the automobile, an inner receptacle adapted to contain the battery, said inner receptacle comprising upright metallic angle elements and horizontal metallic members connecting the ends thereof to form a structure having a substantially open top for insertion and removal of the battery, and a supporting bottom for the battery, a spring anchorage member secured to each end of each angle element at the vertex thereof, other spring anchorage members secured to the outer receptacle at its interior corners, and a spring connecting each juxtaposed pair of anchorage members supporting the inner receptacle within the outer receptacle, the springs at the top corners exerting forces opposing the forces exerted by the springs at the bottom corners.

6. A battery box for supporting a battery within an automobile comprising an outer metallic receptacle adapted to be mounted on a part of the automobile, an inner metallic receptacle adapted to contain the battery, said inner receptacle comprising upright angle elements and horizontal members connecting the ends of the upright elements to form a skeleton structure having substantially open sides, an open top for insertion and removal of the battery and a support for the bottom of the battery, a spring anchorage member at each exterior corner of the inner receptacle and at each interior corner of the outer receptacle, and a spring connecting each juxtaposed pair of anchorage members supporting the inner receptacle within the outer receptacle, the springs at the top corners exerting forces opposing the forces exerted by the springs at the bottom corners, and flexible casings surrounding the springs adapted to contain a corrosion-preventing material.

DENES HAVAS.